United States Patent [19]

Malone et al.

[11] Patent Number: 4,819,858
[45] Date of Patent: Apr. 11, 1989

[54] METHOD OF CLADDING A STEEL CORE ROD WITH ANOTHER METAL

[75] Inventors: William M. Malone; Malcolm J. Fraser, both of Pittsburgh, Pa.

[73] Assignee: Copperweld Corporation, Pittsburgh, Pa.

[21] Appl. No.: 502,968

[22] Filed: Jun. 10, 1983

[51] Int. Cl.⁴ .............................................. B21D 39/04
[52] U.S. Cl. ............................... 228/173.7; 228/130; 228/200
[58] Field of Search ............... 228/124, 130, 148, 156, 228/193, 200, 222; 29/474.1; 219/9.5

[56] References Cited

U.S. PATENT DOCUMENTS

| | | | |
|---|---|---|---|
| Re. 28,526 | 8/1975 | Ziemek | 228/130 |
| 1,685,269 | 9/1928 | Bundy | 228/130 |
| 2,210,338 | 8/1940 | Quarnstrom | 228/130 |
| 2,396,730 | 3/1946 | Whitfield et al. | 228/200 |
| 3,091,848 | 6/1963 | Frank | 228/200 |
| 3,451,836 | 6/1969 | Spooner et al. | 228/222 |
| 3,562,899 | 2/1971 | Stout et al. | 228/130 |
| 3,714,701 | 2/1973 | Dion et al. | 29/474.1 |
| 3,716,908 | 2/1973 | Rowell | 228/156 |
| 3,807,031 | 4/1974 | Jachimowicz et al. | 228/130 |
| 3,818,173 | 6/1974 | Zinsser et al. | 228/200 |
| 3,894,675 | 7/1975 | Klebl et al. | 228/193 |
| 4,134,528 | 1/1979 | Bähre et al. | 228/130 |
| 4,156,500 | 5/1979 | Yoshida | 228/130 |
| 4,227,061 | 10/1980 | Westfall et al. | 219/9.5 |
| 4,331,283 | 5/1982 | Fraser | 228/130 |

FOREIGN PATENT DOCUMENTS

| | | | |
|---|---|---|---|
| 946481 | 4/1974 | Canada | 228/148 |
| 2153316 | 5/1973 | Fed. Rep. of Germany | 228/130 |
| 2153318 | 5/1973 | Fed. Rep. of Germany | 228/130 |

OTHER PUBLICATIONS

William Smith, Structure and Properties of Engineering Alloys, 1981, p. 14.
Tendler, "Controlled Cooling of Rods", Wire Journal, Feb., 1981, pp. 84–91.
"Hardening of Rail Steels by Quenching in Boiling Water", Industrial Heating, Mar., 1981, pp. 8–10.
Economopoulos et al., "The EDC Process: Metallurgical Background and Indus. Applic.", Wire Journal, Mar., 1981, pp. 90–95.

Primary Examiner—Kurt Rowan
Attorney, Agent, or Firm—Arnold B. Silverman

[57] ABSTRACT

A method of cladding a medium or high steel core rod with another metal includes a hot water quench at a temperature of about 160° F. to boiling temperature and preferably about 195° F. to 205° F. with a subsequent quench in water at a temperature below a level of the first temperature and preferably at about ambient temperature. The clad material is found to be substantially devoid of objectionable oxide particles or surface sponge particles and the steel core substantially devoid of acicular transformation products permitting continued processing by deformation processes, such as wire drawing.

17 Claims, 1 Drawing Sheet

METHOD OF CLADDING A STEEL CORE ROD WITH ANOTHER METAL

BACKGROUND OF THE INVENTION

1. Field of the Invention

The present invention relates to an improved method for cladding a steel core rod with another metal in such fashion that formation of objectionable oxides is resisted.

2. Brief Description of the Prior Art

It has been known for various reasons to clad a metal rod with another metal so as to obtain certain beneficial properties of the core material along with the surface or other characteristics of the cladding material while effecting certain economic benefits through the relatively limited use of the generally more expensive cladding material. See generally, U. S. Pat. Nos. 3,714,701; 4,227,061; and 4,331,283. In known systems it has been suggested to employ one or two metal cladding strips composed of a material, such as copper, for example which are preheated and may be preformed to enable solid phase bonding about the circumference of a preheated core rod member which may be composed of steel.

For many uses, the clad product is reduced in diameter, as by a drawing operation, in order to provide a uniformly clad product of the desired dimensions.

One of the problems which has been encountered with respect to the continuous cladding process, with particular emphasis on medium and high carbon steels core materials is that the required slow cooling procedures employed to avoid hardening of the steel core have also resulted in the formation of objectionable levels of oxides on the surface of the clad material. It has been known to try to obtain a clean rod surface for further processing by subsequently chemical cleaning, as by pickling, for example, or mechanically removing the surface oxide layer. It has also been known to enclose the slow cooling zone entirely in an inert or reducing atmosphere. These adjuncts to the main process are quite cumbersome.

We have previously suggested passing the clad rod, after suitable reduction of temperature by air cooling, through a reducing atmospheric chamber containing, for example, cracked ammonia, in order to reduce the previously formed oxide layer to the original metallic form. A meaningful problem with this approach is that the reduced metallic layer is porous and mechanically unstable as a direct result of the gaseous reduction process. This layer will tend to disintegrate during subsequent drawing or deformation processing to form a surface flake or dust which is highly objectionable and can interfere with subsequent processing or use of the clad product.

While it has previously been known to quench steel products in boiling water to effect reasonably rapid cooling while avoiding undesired formation of a circular transition products, it has not been previously suggested to employ boiling water quenches in respect of clad steel products in order to accomplish our objectives. See generally, Tendler, "Controlled Cooling of Rods", Wire Journal, February, 1981, pp. 84–91; "Hardening of Rail Steels by Quenching in Boiling Water", Industrial Heating, March, 1981 pp. 8–10; and Economopoulos et al., "The EDC Process: Metallurgical Background and Industrial Applications", Wire Journal, March, 1981, pp. 90–95.

There remains, therefore, a very real and substantial need for a process of producing a clean, continuously clad steel product which may be further processed and employed without cumbersome special atmosphere containing cooling enclosures or subsequent chemical or mechanical cleaning operations to eliminate oxide involvement or loss of metal either to oxide formation or through formation of metal sponge which is subsequently removed or falls off.

SUMMARY OF THE INVENTION

The present invention has solved the above-described problem.

Subsequent to effecting bonding of the cladding material to the steel rod, the clad product is immersed in a hot water quench which is at or slightly under the boiling temperature of the water. The product thus cooled is then immersed in a second quenching media which may be water at a reduced temperature. The first quench is at about 160° F. to 212° F., depending on the carbon content of the steel core being treated, and preferably about 195° F. to 205° F. The quenching action is preferably accomplished at atmospheric pressure.

The process is particularly effective with respect to medium or high carbon steel rod employed as the core material.

It is an object of the present invention to provide an improved method for resisting undesired oxide formation on the surface of a clad steel product.

It is a further object of the present invention to resist oxide formation on the clad products surface without requiring either chemical oxide removal procedures, such as pickling, or mechanical oxide removal procedures before further processing such as drawing.

It is a further object of the present invention to provide such a system which is economical to employ and efficient to use.

It is another object to produce a bright clad surface and avoid creation of the surface layer of reduced metal sponge.

It is yet another object of the invention to provide such a process which eliminates the need for using air cooling or alternate cooling means such as inert or reducing atmosphere containments.

These and other objects of the invention will be fully understood from the following description of the invention on reference to the illustrations appended hereto.

DESCRIPTION OF THE PREFERRED EMBODIMENTS

As used herein the term "medium carbon steel" will refer to steel having about 0.16 to 0.30% carbon and "high carbon steel" will refer to steel having a carbon content of greater than about 0.30%.

While the method of handling the individual cladding strips and the core rod as well as the method of solid bonding the same forms no part of the present invention and any acceptable means may be employed upstream of the unique cooling process of the present invention, reference will be made to a means of effecting cladding in the interest of completeness of description. The specific means illustrated is disclosed in U.S. Pat. No. 4,227,061.

Figure 1:
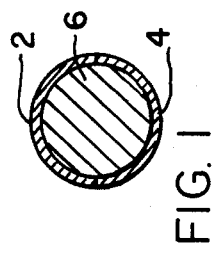
FIG. 1 is a cross-sectional illustration of a form of product made by the present invention.

As is shown in FIG. 1, the final product will consist of one or more cladding strips 2, 4 bonded to a core 6.

Figure 2:
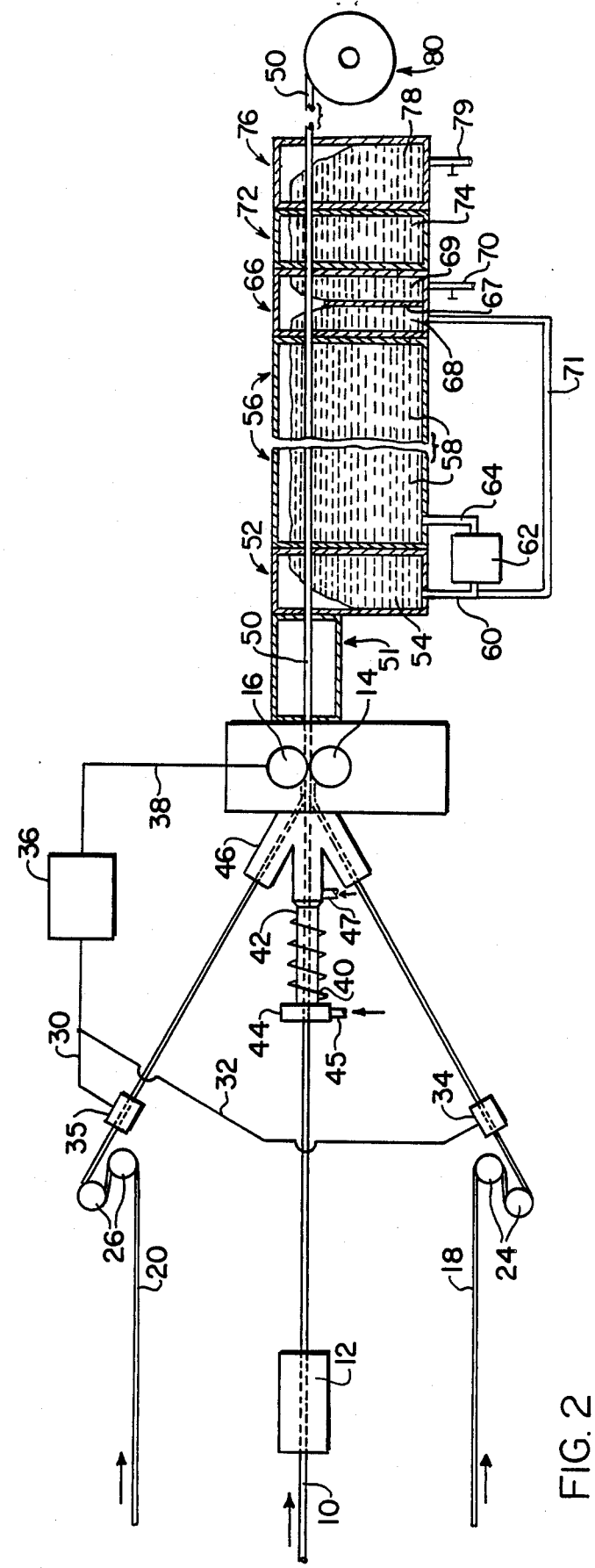
FIG. 2 is a partially schematic illustration of a system adapted for use with the method of the present invention.

In the form illustrated, in FIG. 2, a steel core 10, which may take the form of a rod, is passed through a cleaning station 12 which cleans the exterior surface of the rod 10. The rod, which may conveniently be provided from a reel of the material (not shown), is traveling in the direction illustrated by the arrow. It will be caused to effect solid bonding with metal cladding strips 18, 20 in the bonding rolls 14, 16 each of which is provided with a groove to receive a portion of the cladding strip-core assembly. The cladding strips 18, 20 are either cleaned or have been cleaned as a part of this process and passed through tensioning rolls 24, 26, respectively, and then through electrically energized electrical contact shoes 34, 35, respectively, which serve to heat the strips 18, 20 by resistance and are energized by means of power source 36 and wires 30, 32. Power source 36 also is connected to bonding rolls 14, 16 through wire 38 in order to provide the low potential end of the circuit.

The core rod 10 is also preheated. This preheating is accomplished by means of an electrical induction coil 40 around which is supported on a nonconducting tube 42. An end cap 44 is provided with a tubular inlet 45 through which a gas which inhibits oxidation of the rod may be introduced into tube 18. A positive-pressure chamber 46 is provided within the regions receiving the rod 10 and the cladding strips 18, 20 and is adapted to receive a reducing gas which resists oxidation of the rod and strips before bonding.

In a preferred embodiment of the invention the steel core 10 will be composed of a medium or high carbon steel. Among the preferred cladding materials are those metals which are not sensitive to the cooling rates resulting from the hot water quench employed herein and do not suffer surface oxidation when exposed to water or a suitably buffered water base solution at temperatures ranging from ambient to the boiling point of the water such as monel, for example. The preferred cladding material will be a material selected from the group consisting of copper, copper alloys, nickel and nickel alloys.

After bonding, the clad product 50 emerges from the bonding equipment and passes through a transition chamber 51 containing an inert or reducing gas, such as cracked ammonia. The composite material, which preferably is traveling at about 45 to 60 feet per minute, first travels through overflow tank 52 which contains water 54 essentially at the same temperature as water 58 in first quench tank 56. Cracked ammonia from chamber 51 also enters tank 52 and overlies water 54. Thus, both the water 54 and ammonia protect the clad product 50 from corrosive or oxidizing environments. Tank 56 has water 58 at a temperature of about 160° F. to the boiling point. With pure water the boiling point will be 212° F., at one atmosphere. The water temperature is preferably about 195° F. to 205° F. The composite article 50 as it emerges from the bonding equipment typically has a temperature of about 1650° F. to 1800° F. or greater. The hot water quench will be sufficient in terms of water temperature and dwell time to reduce the steel core rod to less than about 1100° F. in the first quench tank 56. The cooled composite rod 50 is then passed through a second overflow tank 66 which contains water and a gas such as nitrogen in the overlying space. Rod 50 then goes to a second quench in tank 72 which has water 74 at a reduced temperature with respect to water 58 and preferably less than about 80° F. or at ambient temperature.

The tanks 52, 56, 66, 72 and 76 may be made of any suitable material, such as stainless steel or coated steel, for example, and may be generally rectangular in plan. Tanks 52, 56, and 66 will generally have a sealed top closure and tanks 72 and 76 may be open or closed.

It is contemplated that from the time the clad steel core emerges from the bonding rolls 14, 16 until it emerges from second quench tank 72, it will not have any significant exposure to corrosive or oxidizing environments. In the form illustrated, this is accomplished by the protective gaseous environment in chamber 51 and by maintaining the clad product 50 under the protective atmosphere and/or water surface level in tanks 52, 56, 66 and 72.

Openings are provided in the walls of tanks 52, 56, 66 and 72 to permit the passage of clad rod 50 therethrough. If desired, some sealing means may be provided. To the extent water 58 emerges from tank 56, on the upstream side, it will be received in overflow tank 52. Such water is indicated as "54". Second overflow tank 66 is divided by wall 67 and has elevated temperature water 68 from tank 56 on the upstream side and cooler water 69 from tank 72 on the downstream side. Pipes 60, 71, 64 and pump 62 permit water 54 from tank 52 and water 68 from tank 66 to be returned to tank 56.

Water emerging from tank 72 at the wall adjacent overflow tank 66 will enter overflow tank 66 as water 69 and may be withdrawn through drain 70. Also, some of water 74 will enter third overflow tank 76 as water 78 and may be discharged through drain 79.

Suitable sources of makeup water (not shown) and heating means (not shown) such as immersion heaters, steam heaters, and heat exchangers, for example, may be provided for startup and adjustment. The heat contained within the clad rod may be adequate to maintain water 58 at the desired temperature.

The clad product 50 may, if desired, be passed through a skiving stage (not shown) in order to trim any superfluous cladding material, such as fins, projecting from the exterior. The cooled rod may then be wound on take-up reel 80. The composite may be subjected to a drawing operation either directly from the cooling station or may be rewound on reel 80 for storage and/or transport prior to further processing. The dwell time (at the above-stated travel rate) of any segment of the clad rod in tank 56 will be about 15 to 50 seconds and preferably about 25 to 45 seconds.

EXAMPLE

In order to provide further guidance as to the nature of the invention, an example will be considered.

A cladding line which may be of any type suitable for advancing the rod and strip or strips to be bonded thereto including appropriate preheating means and bonding rolls may be provided. The core member may consist of a C1060 steel core rod having a diameter of about 0.344 inches and two cladding strips each having a width approximating one half the circumference of the steel rod. The cladding strips may be composed of CDA102 copper having a width of 0.625 inch and a thickness of about 0.032 inch. The steel core rod is preheated to about 1800° F. as by radio frequency induction heating and the copper cladding strips are heated to about 1200° F. as by resistance heating. The exit temperature of the clad product from the bonding rolls is about 1700° F. The clad rod has a diameter of about 91 percent of the sum of the diameter of the rod and the thickness of both of the original strips with the reduction being effected during passage through the bonding rolls.

The clad rod is advanced at the rate of about 55 feet per minute. The first water quench contains water and has a width of about 8 inches, a depth of about 6 inches and a length of about 30 feet. It contains water at a temperature of about 200° F. Each segment of the clad rod has a dwell time in the hot water of about 33 seconds as it passes through the first water quench and emerges at a temperature of about 950° F. to 1000° F. The clad rod is then preferably introduced into a further water quench in a trough which is about 8 inches wide by 6 inches deep by 8 feet long and contains water at ambient temperature. The clad product is shown to be substantially devoid of objectionable accumulations of surface oxides and to have a clean appearance.

It will be appreciated that the method of the present invention provides effective cooling of the composite in a manner which reduces the steel core temperature while resisting formation of acicular transformation products and also while resisting any meaningful or potentially burdensome oxidation formation on the exterior surface of the cladding material. It will further be appreciated that all of this is accomplished while not requiring either chemical cleaning of the product such as pickling or mechanical cleaning and while further avoiding air cooling with subsequent reduction of the oxide in cracked ammonia, for example, to produce potentially troublesome sponge.

It will further be appreciated that, if desired, the quenching may be accomplished at other than atmospheric pressure with a corresponding adjustment in boiling temperatures of the water and such modifications, while special cases, are contemplated as falling within the invention. Also, certain additives which may alter the boiling point may be provided. Reference herein to "cooling liquid" and its associated boiling point shall be deemed to encompass water with or without additives and such water under atmospheric or different pressures and the boiling points which such water will have with such additives or under influence of such pressures.

It will be appreciated that while for convenience of illustration a system involving two distinct clad strips 18, 20 has been illustrated, if desired the cladding may be accomplished with a single strip or with more than two strips.

It will further be appreciated that while reference has been made herein to a core which is "rod form" and generally the rod will be of substantially cylindrical configuration, other profiles may be employed if desired Whereas particular embodiments of the invention have been described above for purpose of illustration it will be evident to those skilled in the art that numerous variations of the details may be made without departing from the invention as defined in the appended claims.

We claim:

1. A method of cladding a steel core rod with at least one cladding strip composed of another metal by preheating said core rod and said strip, positioning said strip around said core rod and effecting solid-phase bonding of said cladding strip to said core rod while said core rod and said strip are advancing comprising, subsequent to effecting said bonding immersing said clad steel rod in a first cooling liquid quench at a temperature of about 160° F. to boiling temperature of said cooling liquid, and subsequently immersing said clad rod in second cooling liquid quench having a temperature below said first cooling liquid quench whereby undesired formation of acicular transformation products in said core rod is resisted and oxidation formation on the exterior surface of said cladding is resisted.

2. The method of claim 1 including subsequent to effecting said bonding but prior to said first cooling quench passing said clad steel rod through a transition chamber containing an inert or reducing gas.

3. The method of claim 2 including employing water with or without additives as said first and second cooling liquids.

4. The method of claim 3 including effecting said first immersion in water having a temperature of about 160° F. to 212° F.

5. The method of claim 4 including employing said second cooling water at a temperature below about 80° F.

6. The method of claim 5 including employing two said cladding strips.

7. The method of claim 6 including effecting said first quench at a temperature of about 195° F. to 205° F.

8. The method of claim 7 including employing a cladding material selected from the group consisting of copper, copper alloys nickel and nickel alloys.

9. The method of claim 8 including reducing the temperature of said steel core rod to less than about 1100° F. in said first water quench.

10. The method of claim 9 including effecting said first water quench at about atmospheric pressure.

11. The method of claim 10 including effecting said cladding on a steel rod selected from the group consisting of medium carbon steel rod and high carbon steel rod.

12. The method of claim 11 including effecting said cladding on a steel rod having a carbon content in excess of about 0.16 percent.

13. The method of claim 12 including effecting said second water quench in water at about ambient temperature 14. The method of claim 13 including advancing said cad rod through said first water quench at a rate of about 45 to 60 feet per minute.

15. The method of claim 11 including said steel rod having a diameter less than about ½ inch.

16. The method of claim 14 including each portion of said clad steel rod having a dwell time in said hot water quench of about 15 to 50 seconds.

17. The method of claim 15 including each portion of said clad steel rod having a dwell time in said hot water quench of about 25 to 45 seconds.

* * * * *

UNITED STATES PATENT AND TRADEMARK OFFICE
CERTIFICATE OF CORRECTION

PATENT NO. : 4,819,858

DATED : April 11, 1989

INVENTOR(S) : WILLIAM M. MALONE and MALCOLM J. FRASER

It is certified that error appears in the above-identified patent and that said Letters Patent is hereby corrected as shown below:

Column 1, lines 60-61, "a circular" should be --acicular--.

Column 5, line 59, a period --.-- should be inserted at the end of the paragraph.

Claim 14, column 6, line 54, "cad" should be --clad--.

Signed and Sealed this

Twenty-first Day of November, 1989

Attest:

JEFFREY M. SAMUELS

Attesting Officer     Acting Commissioner of Patents and Trademarks